(12) United States Patent
Yoon et al.

(10) Patent No.: US 11,693,517 B2
(45) Date of Patent: Jul. 4, 2023

(54) TOUCH POWER MANAGEMENT CIRCUIT AND TOUCH DRIVING SYSTEM INCLUDING THE SAME

(71) Applicant: LX Semicon Co., Ltd., Daejeon (KR)

(72) Inventors: Seong Sik Yoon, Daejeon (KR); Seong Wha Hong, Daejeon (KR)

(73) Assignee: LX SEMICON CO., LTD., Daejeon (KR)

(*) Notice: Subject to any disclaimer, the term of this patent is extended or adjusted under 35 U.S.C. 154(b) by 0 days.

(21) Appl. No.: 17/685,899

(22) Filed: Mar. 3, 2022

(65) Prior Publication Data
US 2022/0283665 A1    Sep. 8, 2022

(30) Foreign Application Priority Data
Mar. 5, 2021    (KR) .......................... 10-2021-0029523

(51) Int. Cl.
*G06F 3/041* (2006.01)

(52) U.S. Cl.
CPC ........ *G06F 3/04184* (2019.05); *G06F 3/0412* (2013.01); *G06F 2203/04114* (2019.05)

(58) Field of Classification Search
None
See application file for complete search history.

(56) References Cited

U.S. PATENT DOCUMENTS

| | | | |
|---|---|---|---|
| 2020/0210021 A1* | 7/2020 | Ju | G06F 3/0442 |
| 2020/0233518 A1* | 7/2020 | Park | G06F 3/047 |
| 2020/0401258 A1* | 12/2020 | Kang | G09G 3/3275 |

FOREIGN PATENT DOCUMENTS

| | | |
|---|---|---|
| KR | 10-1808339 B1 | 12/2017 |
| KR | 2018-0117975 A | 10/2018 |
| KR | 2019-0068269 A | 6/2019 |
| KR | 2019-0079369 A | 7/2019 |
| KR | 2019-0141405 A | 12/2019 |

* cited by examiner

*Primary Examiner* — Stephen T. Reed
(74) *Attorney, Agent, or Firm* — Polsinelli PC

(57) ABSTRACT

The present disclosure relates to a touch power management circuit and a touch driving system comprising the same, and more particularly, relates to a touch power management circuit to generate signals required for a touch driving by using voltage sources different in a pen touch driving period and a finger touch driving period in order to reduce power consumption of a display device and a touch driving system comprising the touch power management circuit.

20 Claims, 9 Drawing Sheets

TOUCH POWER MANAGEMENT CIRCUIT AND TOUCH DRIVING SYSTEM INCLUDING THE SAME

CROSS REFERENCE TO RELATED APPLICATION

This application claims priority from Republic of Korea Patent Application No. 10-2021-0029523, filed on Mar. 5, 2021, which is hereby incorporated by reference in its entirety.

BACKGROUND

1. Field of Technology

The present disclosure relates to a touch power management circuit and a touch driving system including the same.

2. Description of the Prior Art

One of the most important issues regarding electronic apparatuses, including mobile apparatuses, is to minimize power consumption. Since battery capacity is limited and electronic apparatuses have become smaller, power consumption needs to be lowered. For this reason, research regarding the reduction of the power consumption is in progress.

Each touch display device mounted on the most of recent electronic apparatuses is made by adding a touch driving circuit to perceive a touch of a touch pen or a finger to a general display device. Accordingly, such a display device has power consumption higher than that of other general display devices.

A touch power management circuit, known as a touch modulation integrated circuit (TMIC), generates a voltage signal required for a touch driving inside a touch display device and supplies the voltage signal to a touch driving circuit. Accordingly, a touch power management circuit may have power consumption higher than that of other components.

Since the use of electronic apparatuses (for example, smartphones, notebooks, tablet PCs, etc.) using batteries as power sources has increased recently, research on the reduction of battery consumption of an electronic apparatus by minimizing power consumption of a touch power management circuit is in progress.

In this regard, the present disclosure is to provide a technology for improving a touch power management circuit in terms of power consumption.

SUMMARY OF THE INVENTION

In this background, an aspect of the present disclosure is to generate a signal required for a touch driving by using power sources different during a pen touch driving period and a finger touch driving period so as to reduce power consumption of a display device.

To this end, in an aspect, the present disclosure provides a touch power management circuit comprising: a first driving signal generating circuit to output a finger touch driving signal, in which a first modulation voltage and a second modulation voltage alternate, during a finger touch driving period; and a second driving signal generating circuit to receive a first power voltage and a second power voltage from an external circuit and to output a pen touch driving signal, in which the first power voltage and the second power voltage alternate, during a pen touch driving period, wherein the first power voltage is higher than the first modulation voltage and the second power voltage is lower than the second modulation voltage.

In another aspect, the present disclosure provides a touch driving system comprising: a touch driving device to drive a plurality of touch electrodes disposed in a panel; and a touch power management circuit to output a finger touch driving signal to the touch driving device during a finger touch driving period and to output a pen touch driving signal to the touch driving device by using a first power voltage and a second power voltage received from an external circuit during a pen touch driving period, wherein the finger touch driving signal is a signal in which a first modulation voltage and a second modulation voltage alternate and the pen touch driving signal is a signal in which the first power voltage and the second power voltage alternate.

In still another aspect, the present disclosure provides a touch power management circuit comprising: a first load free driving (LFD) signal generating circuit to receive a gate low voltage from a power management integrated circuit and to output a first load free driving signal, in which the gate low voltage and a modulation voltage higher than the gate low voltage alternate, during a finger touch driving period; and a second LFD signal generating circuit to receive a power voltage higher than the modulation voltage from an external circuit and to output a second load free driving signal, in which the gate low voltage and the power voltage alternate, during a pen touch driving period.

The power voltage may be a ground (GND) voltage inputted from a ground of the touch power management circuit.

The first LFD signal generating circuit may comprise an amplifier to output the modulation voltage; a first switch circuit, one end of which is electrically connected with an output side of the amplifier and the other end of which is electrically connected with an output line to output the first load free driving signal or the second load free driving signal; and a second switch circuit, one end of which is electrically connected with a VGL input line to input the gate low voltage and the other end of which is electrically connected with the output line, wherein the first switch circuit is turned on and the second switch circuit is turned off when the first LFD signal generating circuit outputs the first load free driving signal having the modulation voltage and the first switch circuit is turned off and the second switch circuit is turned on when the first LFD signal generating circuit outputs the first load free driving signal having the gate low voltage.

The second LFD signal generating circuit may comprise a third switch circuit, one end of which is electrically connected with an input terminal through which the power voltage is inputted and the other end of which is electrically connected with the output line; and the second switch circuit, wherein the third switch circuit is turned off when the first LFD signal generating circuit outputs the first load free driving signal, the first switch circuit is turned off when the second LFD signal generating circuit outputs the second load free driving signal, the third switch circuit is turned on and the second switch circuit is turned off when the second LFD signal generating circuit outputs the second load free driving signal having the power voltage, and the third switch circuit is turned off and the second switch circuit is turned on when the second LFD signal generating circuit outputs the second load free driving signal having the gate low voltage.

As described above, according to the present disclosure, the touch power management circuit may output a pen touch driving signal having an intensity higher than that of signals in the prior arts by using a first power voltage and a second power voltage received from an external circuit. The higher intensity of a pen touch driving signal may improve the pen recognition and reduce the influence of noise, and this may increase the reliability of the pen touch driving.

In addition, since the touch power management circuit outputs a pen touch driving signal by using the first power voltage and the second power voltage, no power consumption occurs in an amplifier and an external compensation circuit.

Further, since the touch power management circuit outputs a load free driving signal having a phase and an amplitude identical to those of a pen touch driving signal by using a third power voltage received from an external circuit, no power consumption occurs in an amplifier and an external compensation circuit.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
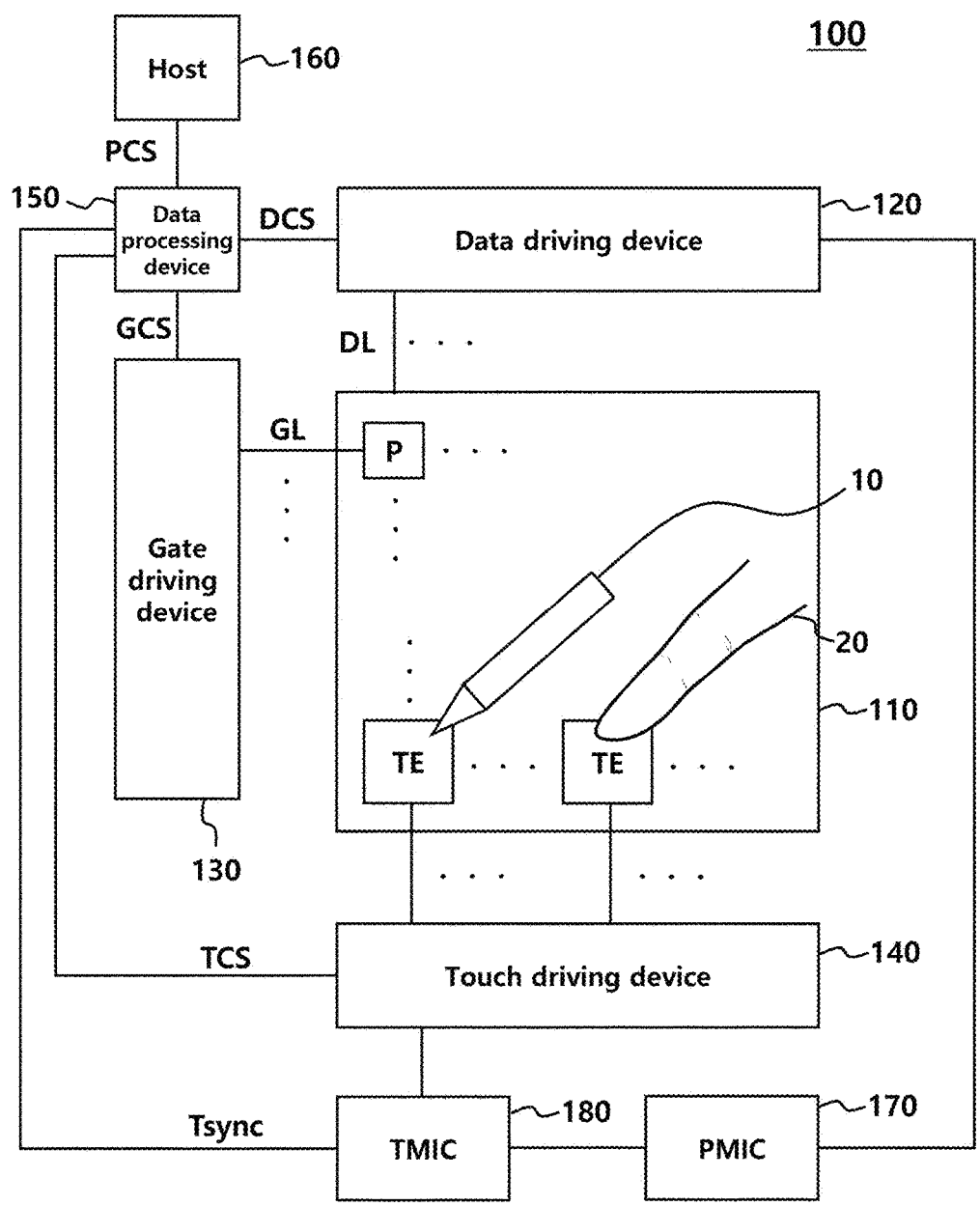
FIG. 1 is a configuration diagram of a display device according to an embodiment.

FIG. 1 is a configuration diagram of a display device according to an embodiment.

Referring to FIG. 1, a display device 100 may comprise a panel 110, a data driving device 120, a gate driving device 130, a touch driving device 140, a data processing device 150, a host 160, a power management integrated circuit (PMIC) 170, and a touch power management circuit 180.

Here, at least one of the data driving device 120, the gate driving device 130, the touch driving device 140, the power management integrated circuit 170, and the touch power management circuit 180 may be comprised in one integrated circuit.

For example, the data driving device 120 and the touch driving device 140 may be comprised in one integrated circuit. The integrated circuit comprising the data driving device 120 and the touch driving device 140 may be referred to as a source readout integrated circuit (SRIC).

The data driving device 120 may drive a data line DL connected with a pixel P and the gate driving device 130 may drive a gate line GL connected with a pixel P. The touch driving device 140 may drive a touch electrode TE disposed in the panel 110.

In the panel 110, a plurality of data lines DL and a plurality of gate lines GL may be disposed. In addition, a plurality of pixels P may also be disposed therein.

A plurality of touch electrodes may also be disposed in the panel 110. In other words, the panel 110 may comprise a display panel and a touch screen panel (TSP). Here, the display panel and the touch screen panel may share some components. For example, touch electrodes TE of the touch screen panel may be used as common electrodes, to which common electrode voltages are supplied, in the display panel.

The data driving device 120 may supply a data voltage to a data line DL so as to display an image in each pixel P of the panel 110. The data driving device 120 may comprise at least one data driver integrated circuit. Such a data driving device 120 may be connected to a bonding pad of a panel 110 in a tape automated bonding (TAB) method or a chip-on-glass (COG) method, directly formed on a display panel 110, or integrated on a panel 110 depending on cases. In addition, the data driving device 120 may be formed in a chip-on-film (COF) type.

The data driving device 120 may receive image data and data control signals DCS from the data processing device 150. The data driving device 120 may generate a data voltage according to a greyscale value of a pixel indicated by the image data and drive the pixel.

The data control signals DCS may comprise at least one synchronization signal. For example, data control signals DCS may comprise a vertical synchronization signal VSYNC, a horizontal synchronization signal HSYNC, a time division signal, etc.

The data driving device 120 may identify the division of frames indicated by the vertical synchronization signal VSYNC and drive pixels in sections other than vertical blank sections indicated by the vertical synchronization signal VSYNC. The data driving device 120 may identify image data for each horizontal line of pixels according to the horizontal synchronization signal HSYNC and supply data voltages to pixels of each horizontal line.

Figure 2:
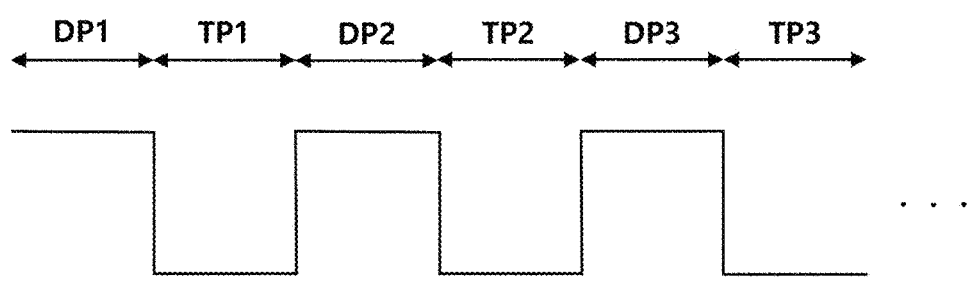
FIG. 2 is a diagram illustrating a general time division driving method of a display device.

As shown in FIG. 2, the data driving device 120 may identify the division of a display driving period DP and a touch driving period TP indicated by a time division signal and drive pixels in the display driving period DP. Here, one frame may be divided into one display driving period DP and one touch driving period TP or into at least two display driving periods DP and at least two touch driving periods TP.

The gate driving device 130 may supply a scan signal to a pixel P through a gate line GL so as to turn on or off a transistor disposed in the pixel P. Depending on a driving method, the gate driving device 130 may be disposed at one side of the panel 110 as shown in FIG. 1 or may be divided into two and disposed at both sides of the panel 110. The gate driving device 130 may comprise at least one gate driver integrated circuit. Such a gate driving device 130 may be connected to a bonding pad of a panel 110 in a tape automated bonding (TAB) method or a chip-on-glass (COG) method, directly formed on a panel 110, or integrated on a panel 110 depending on cases. In addition, the gate driving device 130 may be formed in a chip-on-film (COF) type.

The gate driving device 130 may receive gate control signals GCS from the data processing device 150. The gate control signals GCS may comprise a plurality of clock signals. The gate driving device 130 may generate a scan signal by using a clock signal and supply the scan signal to a gate line GL.

The touch driving device 140 may drive a touch electrode TE by using a touch driving signal in the touch driving period (TP in FIG. 2).

Here, the touch driving device 140 may perceive touches of an active pen 10 or a finger 20. For this, the touch driving device 140 may supply a pen touch driving signal for a pen touch driving to a touch electrode or a finger touch driving signal for a finger touch driving to a touch electrode during the touch driving period TP in FIG. 2.

The touch driving device 140 may receive a downlink signal, that the active pen 10 transmits to a touch electrode, through the touch electrode during the touch driving period TP.

Referring to FIG. 2, for example, the touch driving device 140 may supply a pen touch driving signal to a touch electrode TE during a first touch driving period TP1 and a finger touch driving signal to a touch electrode TE during a second touch driving period TP2 and may receive a downlink signal of the active pen 10 through a touch electrode TE during a third touch driving period TP3.

In general, a touch driving period, where the touch driving device 140 supplies a pen touch driving signal to a touch electrode or receives a downlink signal of the active pen 10 through a touch electrode TE, may be referred to as a pen touch driving period and a touch driving period, where the touch driving device 140 supplies a finger touch driving signal to a touch electrode so as to sense a touch of the finger 20, may be referred to as a finger touch driving period.

A pen touch driving period, where the touch driving device 140 supplies a pen touch driving signal to a touch electrode TE, may be referred to as an uplink driving period and a pen touch driving period, where the touch driving device 140 receives a downlink signal of the active pen 10 through a touch electrode, may be referred to as a downlink driving period. Here, a pen touch driving signal may be a beacon signal comprising various operation control information of the active pen 10 or a ping signal for the synchronization of a downlink signal.

The touch driving device 140 may receive touch control signals TCS from the data processing device 150.

The touch control signals TCS may comprise at least one synchronization signal. For example, the touch control signal may comprise a vertical synchronization signal VSYNC, a time division signal, a touch synchronization signal TSYNC, etc. The touch driving device 140 may identify a display driving period DP and a touch driving period TP by the time division signal or the touch synchronization signal TSYNC.

The host 160 may transmit image data to the data processing device 150 and transmit a vertical synchronization signal to indicate the division of the image data by frame. The data processing device 150 may generate a time division signal, a touch synchronization signal TSYNC, etc. based on the vertical synchronization signal VSYNC and transmit them to the respective driving devices 120, 130, 140.

In addition, the data processing device 150 may transmit a touch synchronization signal TSYNC to the touch power management circuit 180 to be described below.

The power management integrated circuit 170 may generate voltages (power) for respective components inside the display device 100 and output them (it) to the respective components inside the display device 100. For example, the power management integrated circuit 170 may generate a common electrode voltage VCOM and output it to the panel 110, generate a gate low voltage VGL and a gate high voltage VGH and output them to the gate driving device 130, and generate a power voltage and output it to the data driving device 120. Here, the power voltage may comprise at least one of an AVDD voltage, a PVDD voltage, and an NVDD voltage.

The power management integrated circuit 170 may output a common electrode voltage VCOM, a gate low voltage VGL, and a power voltage to the touch power management circuit 180.

The touch power management circuit 180 may output a touch driving signal required for driving a touch electrode TE to the touch driving device 140. Touch driving signals outputted to the touch driving device 140 may be supplied to touch electrodes TE.

The touch power management circuit 180 may output a load free driving (LFD) signal to the touch driving device 140 while outputting a touch driving signal to the touch driving device 140. The load free driving signal outputted to the touch driving device 140 may be supplied to other electrodes around a touch electrode TE to which the touch driving signal is supplied.

For example, when touch driving signals are supplied to touch electrodes TE, a load free driving signal may be supplied to a data line DL or a gate line GL disposed around the touch electrodes TE. In addition, the load free driving signal may be supplied to touch electrodes TE to which the touch driving signals are not supplied. Here, a load free driving signal may have a phase and an amplitude identical to those of a touch driving signal.

According to an embodiment, the touch power management circuit 180 may receive a common electrode voltage VCOM from the power management integrated circuit 170.

Further, the touch power management circuit 180 may output a finger touch driving signal to the touch driving device 140 during a finger touch driving period and output a common electrode voltage VCOM to the touch driving device 140 during a display driving period. Here, the finger touch driving signal may be a signal in which a first modulation voltage (VCOM_H in FIG. 4 or FIG. 7A), higher than the common electrode voltage VCOM, and a second modulation voltage (VCOM_L in FIG. 4 or FIG. 7A), lower than the common electrode voltage, alternate.

The touch power management circuit 180 may output a pen touch driving signal to the touch driving device 140 during a pen touch driving period. Here, the pen touch driving period may be an uplink driving period and a pen touch driving signal may be a beacon signal or a ping signal. The touch power management circuit 180 may receive a first power voltage and a second power voltage from an external circuit and output a pen touch driving signal.

The pen touch driving signal may be a signal in which a first power voltage (V1 in FIG. 7B) and a second power voltage (V2 in FIG. 7B) alternate.

Here, the first power voltage may have a level higher than that of the first modulation voltage and a second power voltage may have a level lower than that of the second modulation voltage. In other words, a pen touch driving signal may have an amplitude wider than that of a finger touch driving signal.

According to an embodiment, the first power voltage may be an AVDD voltage or a PVDD voltage inputted from the power management integrated circuit 170 and the second power voltage may be a GND voltage inputted from a ground GND of the touch power management circuit 180 or an NVDD voltage inputted from the power management integrated circuit 170.

According to an embodiment, the touch power management circuit 180 may receive a gate low voltage VGL from the power management integrated circuit 170.

In addition, the touch power management circuit 180 may output a first load free driving signal to the touch driving device 140 during the finger touch driving period and output a gate low voltage VGL to the touch driving device 140 during the display driving period. Here, the first load free driving signal may be a signal in which a gate low voltage (VGL in FIG. 4, FIG. 8A or FIG. 8B) and a third modulation voltage (VGL_H in FIG. 4 or FIG. 8A) higher than the gate low voltage VGL alternate. The first load free driving signal may have a phase and an amplitude identical to those of the finger touch driving signal.

The touch power management circuit 180 may output a second load free driving signal to the touch driving device 140 during the pen touch driving period. Here, the touch power management circuit 180 may receive a third power voltage from an external circuit and output the second load free driving signal.

The second load free driving signal may be a signal in which the gate low voltage VGL and the third power voltage (V3 in FIG. 8B), higher than the third modulation voltage, alternate. The second load free driving signal may have a phase and an amplitude identical to those of the pen touch driving signal.

According to an embodiment, the third power voltage may be a GND voltage inputted from the ground GND of the touch power management circuit 180.

From here, the reason why the touch power management circuit 180 outputs a pen touch driving signal by using the first power voltage and the second power voltage inputted from an external circuit will be described.

Figure 3:
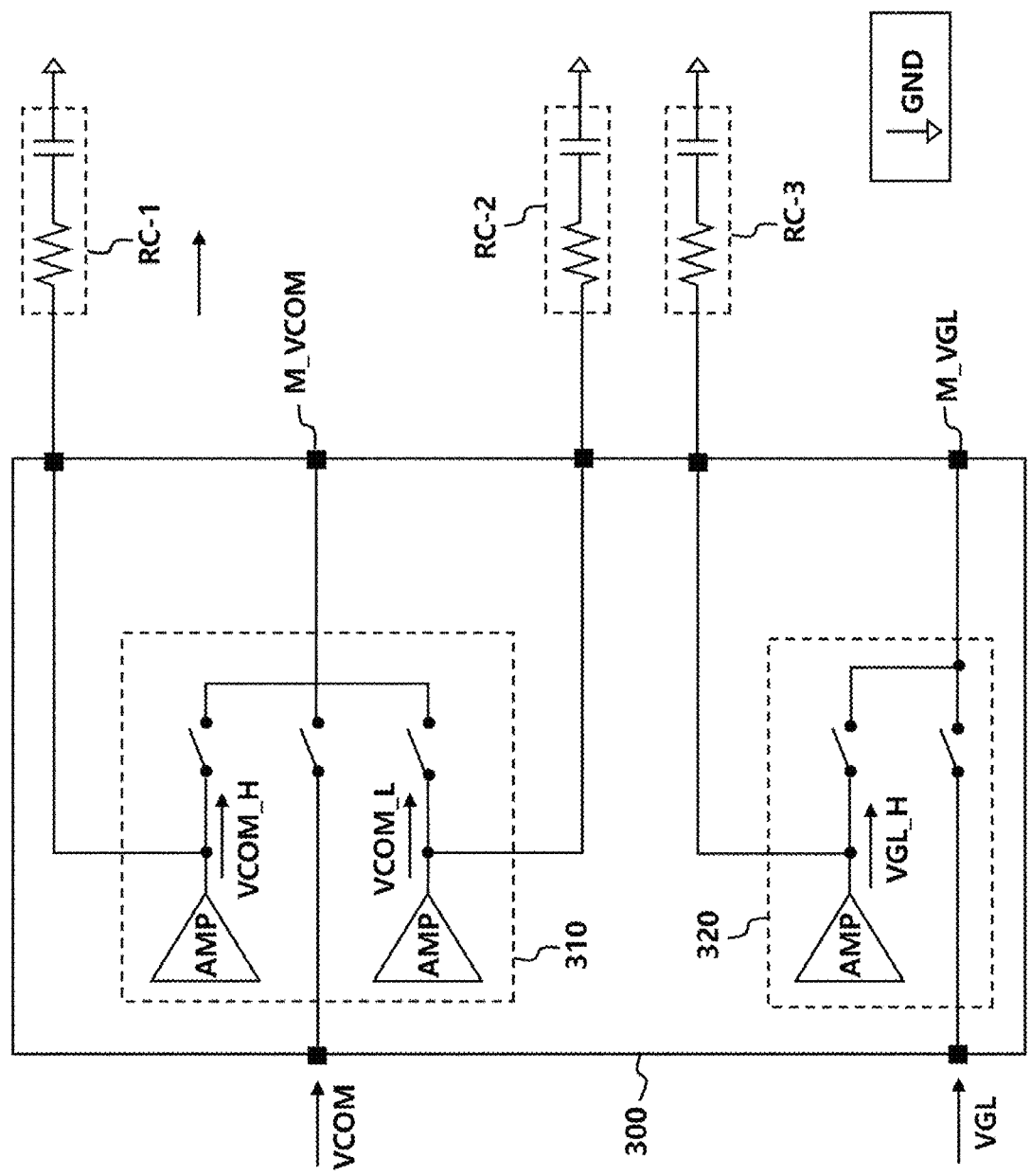
FIG. 3 is a configuration diagram of a general touch power management circuit.

FIG. 3 is a configuration diagram of a general touch power management circuit.

Referring to FIG. 3, a general touch power management circuit 300 may comprise a driving signal generating circuit 310 to output, through a first output terminal M_VCOM, touch driving signals having different amplitudes during a finger touch driving period and during a pen touch driving period and an LFD signal generating circuit 320 to output, through a second output terminal M_VGL, load free driving signals having different amplitudes during the finger touch driving period and the pen touch driving period.

As shown in FIG. 3, the driving signal generating circuit 310 outputs both a finger touch driving signal and a pen touch driving signal by using two amplifiers AMP.

Figure 4:
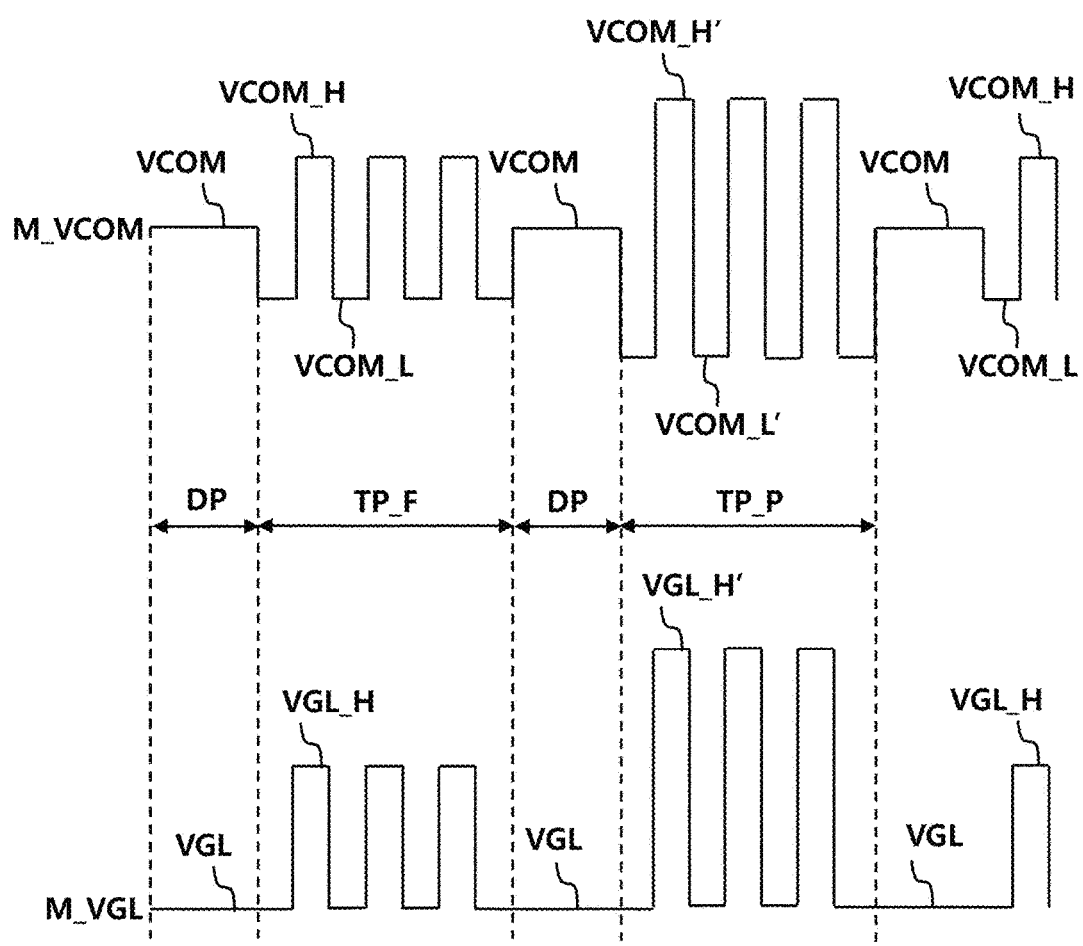
FIG. 4 and FIG. 5 are diagrams illustrating a driving method of a general touch power management circuit.

Here, the driving signal generating circuit 310 outputs a pen touch driving signal having an amplitude wider than that of a finger touch driving signal as shown in FIG. 4.

In other words, a low voltage VCOM_L' of a pen touch driving signal outputted during the pen touch driving period (TP_P in FIG. 4) is lower than a low voltage VCOM_L of a finger touch driving signal outputted during the finger touch driving period (TP_F in FIG. 4) and a high voltage VCOM_H' of the pen touch driving signal is higher than a high voltage VCOM_H of the finger touch driving signal.

In order to output a pen touch driving signal and a finger touch driving signal having different amplitudes as described above, the outputs of the two amplifiers AMP need to be varied.

Meanwhile, the LFD signal generating circuit 320 outputs load free signals respectively during the finger touch driving period and the pen touch driving period by using one amplifier AMP.

Here, a load free signal outputted from the LFD signal generating circuit 320 during the pen touch driving period has an amplitude wider than that of a load free signal outputted therefrom during the finger touch driving period as shown in FIG. 4.

In other words, a high voltage VGL_H' of a load free signal outputted during the pen touch driving period TP_P is higher than a high voltage VGL_H of a load free signal outputted during the finger touch driving period.

In order to output load free signals having different amplitudes, the output of the amplifier AMP comprised in the LFD signal generating circuit 320 needs to be varied.

When changing the output of an amplifier, power consumed by the amplifier generally increases. Therefore, power consumed by the amplifiers AMP of the driving signal generating circuit 310 and the LFD signal generating circuit 320 increases at a time for transition to the finger touch driving period TP_F after the transition from the pen touch driving period TP_P to the display driving period DP. In addition, power consumed by the amplifiers AMP of the driving signal generating circuit 310 and the LFD signal generating circuit 320 also increases at a time for transition to the pen touch driving period TP_P after the transition from the finger touch driving period TP_F to the display driving period DP.

The driving signal generating circuit 310 may comprise external compensation circuits (RC-1, RC-2 in FIG. 3) to increase the accuracy of a finger touch driving signal and the LFD signal generating circuit 320 may also comprise an external compensation circuit (RC-3 in FIG. 3) to generate a phase and an amplitude identical to those of the finger touch driving signal.

Figure 5:
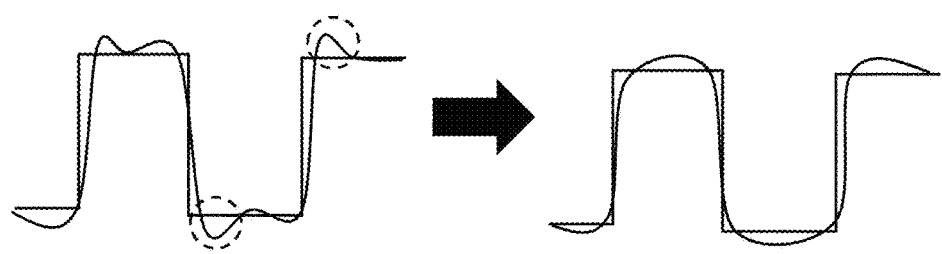

An external compensation circuit may make overshoots or undershoots, (indicated by circles in dotted line in FIG. 5) appearing in a waveform of a signal, absorbed so as to smooth the waveform of a signal. In other words, an external compensation circuit may compensate for distortions of a signal. An external compensation circuit is a necessary component for a finger touch drive in which the accuracy of a signal needs to be high. However, it may be unnecessary for a pen touch drive in which the intensity rather than the accuracy of a signal needs to be high.

When the output of the driving signal generating circuit 310 is varied, a compensation capacitor comprised in an external compensation circuit is charged or discharged. Such a charge or discharge of the capacitor may cause the increase of power consumption.

In other words, when the driving signal generating circuit 310 outputs a finger touch driving signal and subsequently outputs a pen touch driving signal or when it outputs a pen touch driving signal and subsequently outputs a finger touch driving signal, the compensation capacitor is charged or discharged. This charge or discharge may cause the increase of power consumption. Here, the compensation capacitor may be charged or discharged by a voltage difference between the pen touch driving signal and the finger touch driving signal.

As described above, the general touch power management circuit 300 has a problem in that the power consumption increases due to the variation in output of the amplifier and the charge or discharge of the compensation capacitor.

According to an embodiment of the present disclosure, the touch power management circuit 180 outputs a pen touch driving signal by using an external power source without using an amplifier. This allows reducing power consumption of the touch power management circuit.

The detailed description in this regard is as follows.

Figure 6:
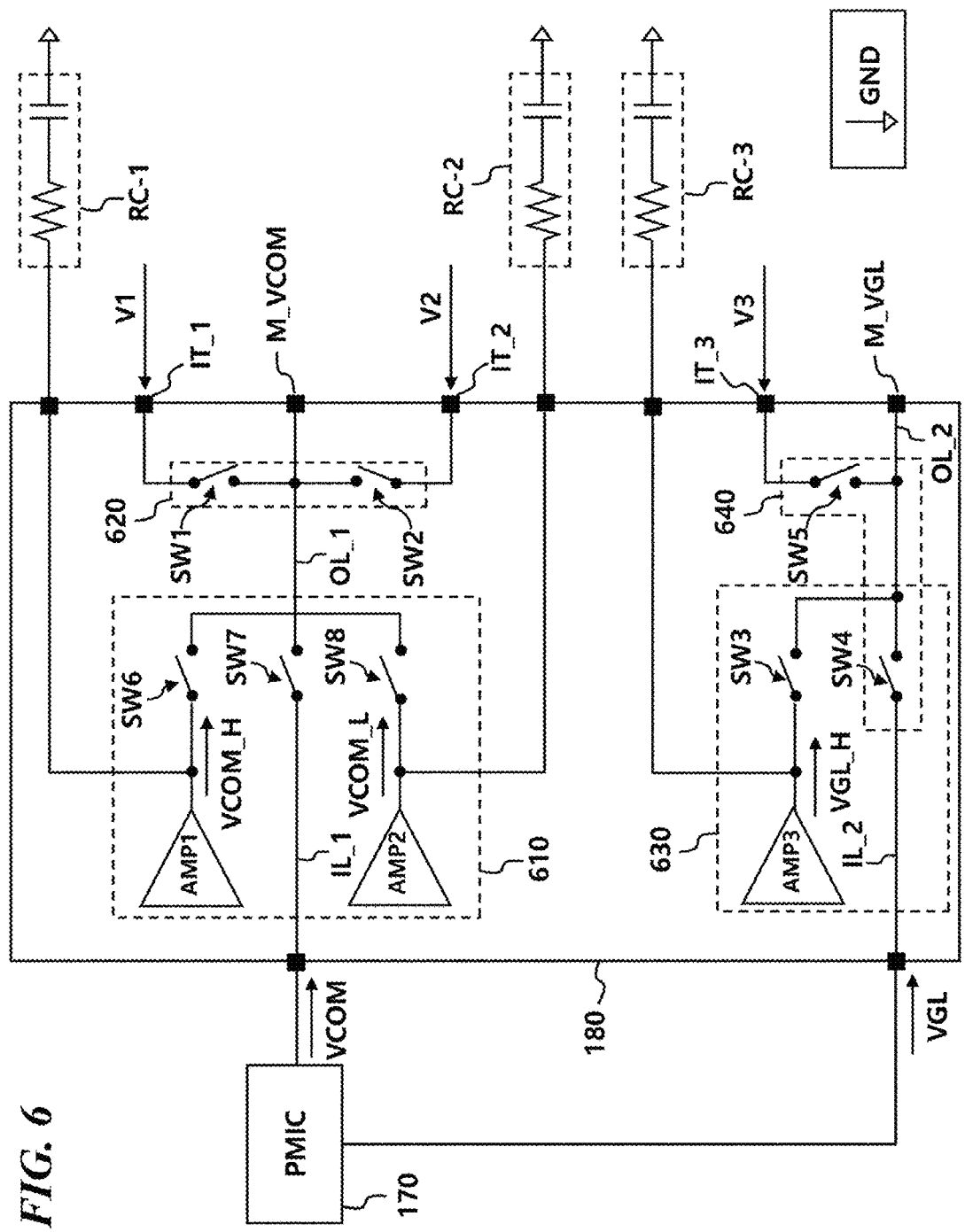
FIG. 6 is a configuration diagram of a touch power management circuit according to an embodiment.

FIG. 6 is a configuration diagram of a touch power management circuit according to an embodiment.

Referring to FIG. 6, the touch power management circuit 180 may comprise a first driving signal generating circuit 610 and a second driving signal generating circuit 620 and further comprise a first load free driving (LFD) signal generating circuit 630 and a second LFD signal generating circuit 640.

The first driving signal generating circuit 610 may receive a common electrode voltage VCOM from a power management integrated circuit (PMIC) 190.

Figure 7A:
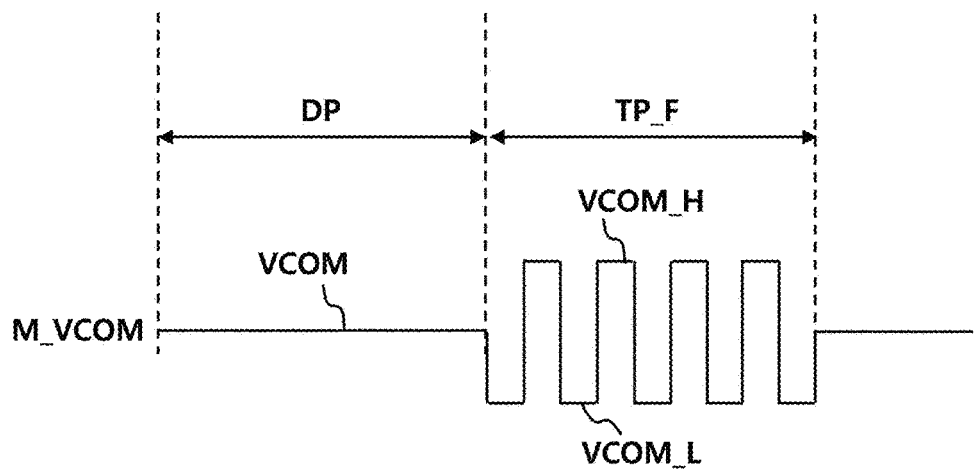
FIG. 7A and FIG. 7B are diagrams illustrating examples of a finger touch driving signal and a pen touch driving signal outputted from a touch power management circuit according to an embodiment.

The first driving signal generating circuit 610 may output a finger touch driving signal through a first output terminal M_VCOM during the finger touch driving period (TP_F in FIG. 7A) and output a common electrode voltage VCOM through the first output terminal M_COM during the display driving period (DP in FIG. 7A). Here, the finger touch driving signal may be a signal in which a first modulation voltage (VCOM_H in FIG. 7A), higher than the common electrode voltage VCOM, and a second modulation voltage (VCOM_L in FIG. 7A), lower than the common electrode voltage VCOM, alternate.

The first driving signal generating circuit 610 may comprise a first amplifier AMP1, a sixth switch circuit SW6, a seventh switch circuit SW7, a second amplifier, and an eighth switch circuit SW8.

The first amplifier AMP1 may output a first modulation voltage VCOM_H.

One end of the sixth switch circuit SW6 may be electrically connected with an output side of the first amplifier AMP1 and the other end thereof may be electrically connected with a first output line OL_1. Here, the one end of the sixth switch circuit SW6 and the output side of the first amplifier may be connected in series.

One end of the seventh switch circuit SW7 may be electrically connected with a VCOM input line IL_1 and the other end thereof may be electrically connected with the first output line OL_1.

The second amplifier AMP2 may output a second modulation voltage.

One end of the eighth switch circuit SW8 may be electrically connected with an output side of the second amplifier AMP2 and the other end thereof may be electrically connected with the first output line OL_1. Here, the one end of the eighth switch circuit SW8 and the output side of the second amplifier AMP2 may be connected in series.

When the first driving signal generating circuit 610 outputs a finger touch driving signal having the first modulation voltage VCOM_H, the sixth switch circuit SW6 is turned on and the seventh switch circuit SW7 and the eighth switch circuit SW8 are turned off.

When the first driving signal generating circuit 610 outputs a finger touch driving signal having the second modulation voltage VCOM_L, the eighth switch circuit SW8 is turned on and the sixth switch circuit SW6 and the seventh switch circuit SW7 are turned off.

The first driving signal generating circuit 610 may repeat the above-described operations and output a finger touch driving signal as shown in FIG. 7A through the first output terminal M_VCOM.

Meanwhile, when the first driving signal generating circuit 610 outputs a common electrode voltage VCOM, the seventh switch circuit SW7 is turned on and the sixth switch circuit SW6 and the eighth switch circuit SW8 are turned off.

When the second driving signal generating circuit 620 outputs a pen touch driving signal through the first output terminal M_VCOM, the sixth switch circuit SW6, the seventh switch circuit SW7, and the eighth switch circuit SW8 are turned off.

Figure 7B:
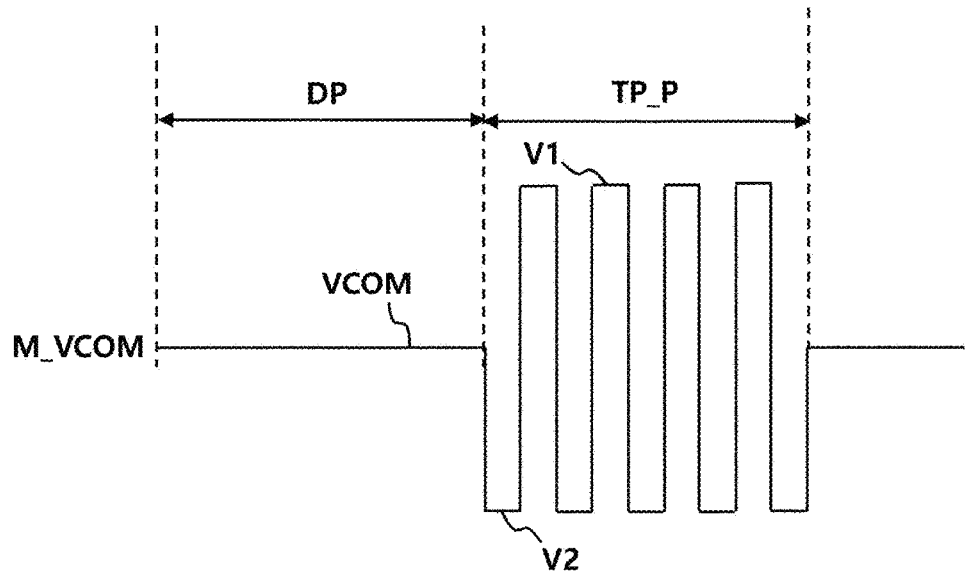

The second driving signal generating circuit 620 may receive a first power voltage V1 and a second power voltage V2 from an external circuit and output a pen touch driving signal through the first output terminal M_VCOM during the pen touch driving period (TP_P in FIG. 7B). Here, the pen touch driving period may be an uplink driving period and the pen touch driving signal may be a beacon signal or a ping signal in which the first power voltage (V1 in FIG. 7B) and the second power voltage (V2 in FIG. 7B) alternate.

According to an embodiment, the first power voltage V1 may be higher than the first modulation voltage VCOM_H and the second power voltage V2 may be lower than the second modulation voltage VCOM_L. In addition, the first power voltage V1 may be higher than the high voltage VCOM_H' of a general pen touch driving signal as shown in FIG. 4 and the second power voltage V2 may be lower than the lower voltage VCOM_L' of a general pen touch driving signal.

In other words, the second driving signal generating circuit 620 may output a pen touch driving signal having an intensity higher than that of a signal in the prior arts by using the first power voltage V1 and the second power voltage V2 received from an external circuit. The higher intensity of a pen touch driving signal may improve the pen recognition and reduce the influence by noise and this may increase the reliability on the pen touch driving.

In addition, since the first driving signal generating circuit 610 outputs a pen touch driving signal by using the first power voltage V1 and the second power volage V2, the power consumption by the amplifier does not occur.

The first power voltage V1 may be an AVDD voltage or a PVDD voltage inputted from the power management integrated circuit 170 and the second power voltage V2 may be a GND voltage inputted from the ground GND of the touch power management circuit 180 or an NVDD voltage inputted from the power management integrated circuit 170.

The second driving signal generating circuit 620 may comprise a first switch circuit SW1 and a second switch circuit SW2.

One end of the first switch circuit SW1 may be electrically connected with a first input terminal IT_1 and the other end thereof may be electrically connected with the first output line OL_1. Here, the first power voltage V1 may be inputted through the first input terminal IT_1 and a finger touch driving signal, a pen touch driving signal, or a common electrode voltage VCOM may be outputted through the first output line OL_1.

One end of the second switch circuit SW2 may be electrically connected with a second input terminal IT_2 and the other end thereof may be electrically connected with the first output line OL_1. Here, the second power voltage V2 may be inputted through the second input terminal IT_2.

When the second driving signal generating circuit 620 outputs a pen touch driving signal having the first power voltage V1, the first switch circuit SW1 is turned on and the second switch circuit SW2 is turned off.

When the second driving signal generating circuit 620 outputs a pen touch driving signal having the second power voltage V2, the second switch circuit SW2 is turned on and the first switch circuit SW1 is turned off.

The second driving signal generating circuit 620 may repeat the above-described operations and output a pen touch driving signal as shown in FIG. 7B through the first output terminal M_VCOM.

Meanwhile, when the first driving signal generating circuit 610 outputs a finger touch driving signal or a common electrode voltage VCOM, the first switch circuit SW1 and the second switch circuit SW2 are turned off.

In other words, the first switch circuit SW1 and the second switch circuit SW2 are turned off during the finger touch driving period and the display driving period.

Referring to FIG. 6, the first driving signal generating circuit 610 is electrically connected with the external compensation circuits (RC-1, RC-2 in FIG. 6) comprising at least one of a damping resistance and a compensation capacitor and the second driving signal generating circuit 620 is not electrically connected with the external compensation circuits.

Therefore, when the second driving signal generating circuit 620 outputs a pen touch driving signal through the first output terminal M_VCOM, the power consumption in the external compensation circuits does not occur.

Specifically, a first external compensation circuit RC-1 is connected in parallel between the output side of the first amplifier AMP1 and the sixth switch circuit SW6 and a second external compensation circuit RC-2 is connected in parallel between the output side of the second amplifier AMP2 and the eighth switch circuit SW8.

According to an embodiment, the first amplifier AMP1 outputs only the first modulation voltage VCOM_H and the second amplifier AMP2 outputs only the second modulation voltage VCOM_L. Accordingly, the compensation capacitor in the first external compensation circuit RC-1 maintains the first modulation voltage VCOM_H and the compensation capacitor in the second external compensation circuit RC-2 maintains the second modulation voltage VCOM_L.

The second driving signal generating circuit 620 is not electrically connected with the first external compensation circuit RC-1 and the second external compensation circuit RC-2 and is electrically connected only with the first input terminal IT_1 through which the first power voltage is inputted and with the second input terminal IT_2 through which the second power voltage is inputted. Accordingly, even when the second driving signal generating circuit 620 outputs a pen touch driving signal through the first output terminal M_VCOM, the compensation capacitors of the first external compensation circuit RC-1 and the second external compensation circuit RC-2 can respectively maintain the first modulation voltage VCOM_H and the second modulation voltage VCOM_L. For this reason, the charging or discharging operation of the compensation capacitors does not occur and this means that there is no power consumption in the first external compensation circuit RC-1 and the second external compensation circuit RC-2.

The first LFD signal generating circuit 630 may receive a gate low voltage VGL from the power management integrated circuit 170.

Figure 8A:
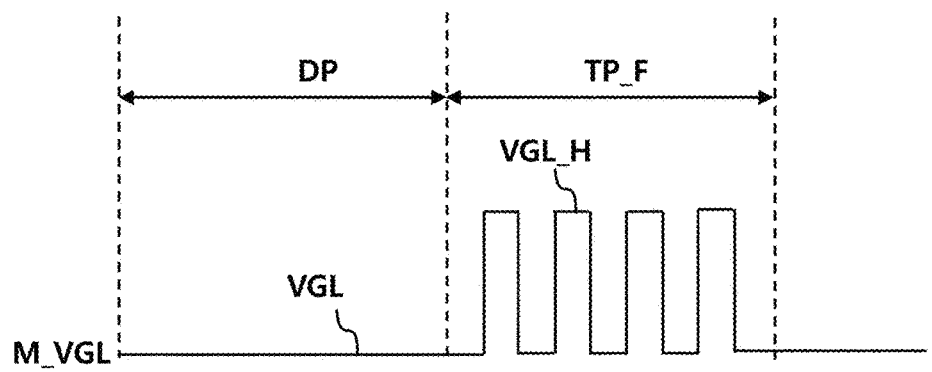
FIG. 8A and FIG. 8B are diagrams illustrating examples of a first load free driving signal in which a touch power management circuit according to an embodiment outputs during a finger touch driving period and a second load free driving signal that the touch power management circuit outputs during a pen touch driving period.

In addition, the first LFD signal generating circuit 630 may output a first load free driving signal to the second output terminal M_VGL during the finger touch period (TP_F in FIG. 8A). Here, the first load free driving signal may be a signal in which a gate low voltage (VGL in FIG. 8A) and the third modulation voltage (VGL_H in FIG. 8A), higher than the gate low voltage VGL, alternate.

The first LFD signal generating circuit 630 may comprise a third amplifier AMP3, a third switch circuit SW3, and a fourth switch circuit SW4.

The third amplifier AMP3 may output the third modulation voltage VGL_H.

One end of the third switch circuit SW3 may be electrically connected with an output side of the third amplifier AMP3 and the other end thereof may be electrically connected with a second output line OL_2.

One end of the fourth switch circuit SW4 may be electrically connected with a VGL input line IL_2 and the other end thereof may be electrically connected with the second output line OL_2.

When the first LFD signal generating circuit 630 outputs a first load free driving signal having the third modulation voltage VGL_H, the third switch circuit SW3 is turned on and the fourth switch circuit SW4 is turned off.

When the first LFD signal generating circuit 630 outputs a first load free driving signal having the gate low voltage VGL, the third switch circuit SW3 is turned off and the fourth switch circuit SW4 is turned on.

The first LFD signal generating circuit 630 may repeat the above-described operations and output a first load free driving signal as shown in FIG. 8A through the second output terminal M_VGL.

Meanwhile, when the first LFD signal generating circuit 630 outputs the gate low voltage VGL, the fourth switch circuit SW4 is turned on and the third switch circuit SW3 is turned off.

When the second LFD signal generating circuit 640 outputs a second load free driving signal through the second output terminal M_VGL, the third switch circuit SW3 is turned off and the fourth switch circuit SW4 is kept alternately being turned on and being turned off.

Figure 8B:
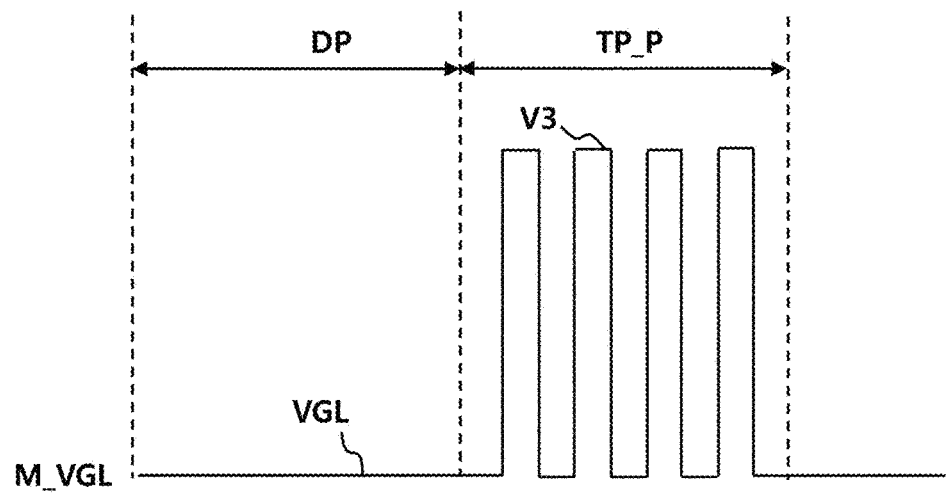

The second LFD signal generating circuit 640 may receive a third power voltage (V3 in FIG. 8B) higher than the third modulation voltage VGL_H from an external circuit and output a second load free driving signal through the second output terminal M_VGL during the pen touch driving period (TP_P in FIG. 8B). Here, the second load free driving signal may be a signal in which the gate low voltage VGL and the third power voltage V3 alternate.

According to an embodiment, the third power voltage V3 may be higher than a high voltage VGL_H' of a load free driving signal (outputted during the pen touch driving) as shown in FIG. 4.

According to an embodiment, since the second LFD signal generating circuit 640 outputs the second load free driving signal by using the third power voltage V3 received from an external circuit, power consumption by an amplifier AMP does not occur.

The third power voltage V3 as described above may be a GND voltage inputted from the ground GND of the touch power management circuit 180.

The second LFD signal generating circuit 640 may comprise a fifth switch circuit SW5 and a fourth switch circuit SW4.

When the first LFD signal generating circuit 630 outputs the first load free driving signal, the fifth switch circuit SW5 is turned off.

When the second LFD signal generating circuit 640 outputs the second load free driving signal having the third power voltage V3, the fifth switch circuit SW5 is turned on and the fourth switch circuit SW4 is turned off.

When the second LFD signal generating circuit 640 outputs the second load free driving signal having the gate low voltage VGL, the fifth switch circuit SW5 is turned off and the fourth switch circuit SW4 is turned on.

The second LFD signal generating circuit 640 may repeat the above-described operations and output a second load free driving signal as shown in FIG. 8B through the second output terminal M_VGL.

Referring to FIG. 6, the first LFD signal generating circuit 630 is electrically connected with an external compensation circuit (RC-3 in FIG. 6) and the second LFD signal generating circuit 640 is not electrically connected with the external compensation circuit.

Accordingly, when the second LFD signal generating circuit 640 outputs the second load free driving signal through the second output terminal M_VGL, no power consumption occurs in the external compensation circuit.

Specifically, a third external compensation circuit RC-3 is connected in parallel between an output side of a third amplifier AMP3 and the third switch circuit SW3.

According to an embodiment, since the third amplifier AMP3 outputs only the third modulation voltage VGL_H, a compensation capacitor in the third external compensation circuit RC-3 maintains the third modulation voltage VGL_H.

The second LFD signal generating circuit 640 is not electrically connected with the third external compensation circuit RC-3, but it is electrically connected with a third output terminal IT_3 through which the third power voltage is inputted. Therefore, even when the second LFD signal generating circuit 640 outputs the second load free driving signal through the second output terminal M_VGL, the compensation capacitor of the third external compensation circuit RC-3 may maintain the third modulation voltage VGL_H. For this reason, the charging or discharging operation of the compensation capacitors does not occur and this means that there is no power consumption in the third external compensation circuit RC-3 when outputting the second load free driving signal.

As described above, according to the present disclosure, the touch power management circuit 180 may output a pen touch driving signal having an intensity higher than that of a signal in the prior arts by using the first power voltage V1 and the second power voltage V2 received from an external circuit. The higher intensity of a pen touch driving signal may improve the pen recognition and reduce the influence by noise and this may increase the reliability on the pen touch drive.

In addition, since the touch power management circuit 180 outputs a pen touch driving signal by using the first power voltage V1 and the second power voltage V2, no power consumption occurs in the amplifiers AMP and the external compensation circuits.

In addition, since the touch power management circuit 180 outputs the second load free driving signal, having a phase and an amplitude identical to those of the pen touch driving signal, using the third power voltage V3 inputted from an external circuit, no power consumption occurs in the amplifiers AMP and the external compensation circuits.

Hereinafter, a control circuit to control the operation of the touch power management circuit 180 will be described.

Figure 9:
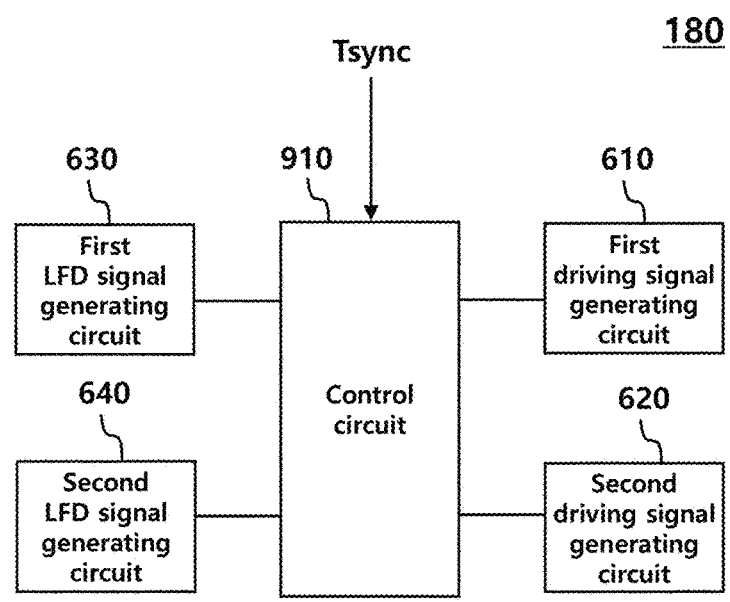
FIG. 9 is a block diagram of a touch power management circuit according to an embodiment.

FIG. 9 is a block diagram of a touch power management circuit according to an embodiment.

Referring to FIG. 9, the touch power management circuit 180 may further comprise a control circuit 910 in addition to the elements shown in FIG. 6.

The control circuit 910 may receive a touch synchronization signal TSYNC from the data processing device 150.

The control circuit 910 may control the first driving signal generating circuit 610 and the second driving signal generating circuit 620 by using the touch synchronization signal TSYNC.

The control circuit 910 may also control the first LFD signal generating circuit 630 and the second LFD signal generating circuit 640 by using the touch synchronization signal TSYNC.

Specifically, the control circuit 910 controls the first amplifier AMP1 and the second amplifier AMP2 to respectively output the first modulation voltage VCOM_H and the second modulation voltage VCOM_L and controls the turn-on and turn-off operations of the first switch circuit SW1, the second switch circuit SW2, the sixth switch circuit SW6, the seventh switch circuit SW7, and the eighth switch circuit SW8 to output a finger touch driving signal through the first output terminal M_VCOM during the finger touch driving period.

In addition, the control circuit 910 controls the third amplifier AMP3 to output the third modulation voltage VGL_H and controls the turn-on and turn-off operations of the third switch circuit SW3, the fourth switch circuit SW4, and the fifth switch circuit SW5 to output a first load free driving signal through the second output terminal M_VGL during the finger touch driving period.

During the pen touch driving period, the control circuit 910 controls the turn-on and turn-off operations of the first switch circuit SW1, the second switch circuit SW2, the sixth switch circuit SW6, the seventh switch circuit SW7, and the eighth switch circuit SW8 to output a pen touch driving signal through the first output terminal M_VCOM.

In addition, the control circuit 910 also controls the turn-on and the turn-off operations of the third switch circuit SW3, the fourth switch circuit SW4, and the fifth switch circuit SW5 to output a second load free driving signal through the second output terminal M_VGL during the pen touch driving period.

What is claimed is:

1. A touch power management circuit comprising:
a first driving signal generating circuit to output a finger touch driving signal, in which a first modulation voltage and a second modulation voltage alternate, during a finger touch driving period; and
a second driving signal generating circuit to receive a first power voltage and a second power voltage from an external circuit and to output a pen touch driving signal, in which the first power voltage and the second power voltage alternate, during a pen touch driving period,
wherein the first power voltage is higher than the first modulation voltage and the second power voltage is lower than the second modulation voltages;
a first load free driving (LFD) signal generating circuit to receive a gate low voltage from a power management integrated circuit and to output, during the finger touch driving period, a first load free driving signal in which a gate low voltage and a third modulation voltage higher than the gate low voltage alternate.

2. The touch power management circuit of claim 1, wherein the pen touch driving period is an uplink driving period and the pen touch driving signal is a beacon signal or a ping signal.

3. The touch power management circuit of claim 1, wherein the first driving signal generating circuit is electrically connected with external compensation circuits, each comprising at least one of a damping resistance and a compensation capacitor, whereas the second driving signal generating circuit is not electrically connected with the external compensation circuit.

4. The touch power management circuit of claim 3, wherein the first driving signal generating circuit comprises:
a first amplifier to output the first modulation voltage;
a sixth switch circuit, one end of which is electrically connected with an output side of the first amplifier and the other end of which is electrically connected with a first output line to output the finger touch driving signal or the pen touch driving signal;
a seventh switch circuit, one end of which is electrically connected with a VCOM input line through which a common electrode voltage is inputted and the other end of which is electrically connected with the first output line;
a second amplifier to output the second modulation voltage;
an eighth switch circuit, one end of which is electrically connected with an output side of the second amplifier and the other end of which is electrically connected with the first output line,
wherein, when the first driving signal generating circuit outputs the finger touch driving signal having the first modulation voltage, the sixth switch circuit is turned on and the seventh switch circuit and the eighth switch circuit are turned off and when the first driving signal generating circuit outputs the finger touch driving signal having the second modulation voltage, the eighth switch circuit is turned on and the sixth switch circuit and the seventh switch circuit are turned off.

5. The touch power management circuit of claim 4, wherein the external compensation circuits comprise:
a first external compensation circuit connected in parallel between the output side of the first amplifier and the sixth switch circuit; and
a second external compensation circuit connected in parallel between the output side of the second amplifier and the eighth switch circuit,
wherein, when the second driving signal generating circuit outputs the pen touch driving signal, the compensation capacitor of the first external compensation circuit maintains the first modulation voltage and the compensation capacitor of the second external compensation circuit maintains the second modulation voltage.

6. The touch power management circuit of claim 1, wherein the second driving signal generating circuit comprises:
a first switch circuit, one end of which is electrically connected with a first input terminal through which the first power voltage is inputted and the other end of which is electrically connected with a first output line through which the finger touch driving signal or the pen touch driving signal is outputted; and
a second switch circuit, one end of which is electrically connected with a second input terminal through which the second power voltage is inputted and the other end of which is electrically connected with the first output line;
wherein, when the second driving signal generating circuit outputs the pen touch driving signal having the first power voltage, the first switch circuit is turned on and the second switch circuit is turned off and, when the second driving signal generating circuit outputs the pen touch driving signal having the second power voltage, the first switch circuit is turned off and the second switch circuit is turned on.

7. The touch power management circuit of claim 6, wherein the first switch circuit and the second switch circuit are turned off during the finger touch driving period.

8. The touch power management circuit of claim 1, wherein the first power voltage is an AVDD voltage or a PVDD voltage inputted from a power management integrated circuit and the second power voltage is a GND voltage inputted from a ground GND of the touch power management circuit or an NVDD voltage inputted from the power management integrated circuit.

9. The touch power management circuit of claim 1 further comprising:
a second LFD signal generating circuit to receive a third power voltage higher than the third modulation voltage from an external circuit and to output, during the pen touch driving period, a second load free driving signal in which the gate low voltage and the third power voltage alternate.

10. The touch power management circuit of claim 9, wherein the first LFD signal generating circuit comprises:
a third amplifier to output the third modulation voltage;
a third switch circuit, one end of which is electrically connected with an output side of the third amplifier and the other end of which is electrically connected with a second output line to output the first load free driving signal or the second load free driving signal; and
a fourth switch circuit, one end of which is electrically connected with a VGL input line through which the gate low voltage is inputted and the other end of which is electrically connected with the second output line,
wherein, when the first LFD signal generating circuit outputs the first load free driving signal having the third modulation voltage, the third switch circuit is turned on and the fourth switch circuit is turned off and when the first LFD signal generating circuit outputs the first load free driving signal having the gate low voltage, the third switch circuit is turned off and the fourth switch circuit is turned on.

11. The touch power management circuit of claim 10, wherein the second LFD signal generating circuit comprises:
a fifth switch circuit, one end of which is electrically connected with a third input terminal through which the third power voltage is inputted and the other of which is electrically connected with the second output line; and
the fourth switch circuit,
wherein, when the first LFD signal generating circuit outputs the first load free driving signal, the fifth switch circuit is turned off and when the second LFD signal generating circuit outputs the second load free driving signal, the third switch circuit is turned off,
when the second LFD signal generating circuit outputs the second load free driving signal having the third power voltage, the fifth switch circuit is turned on and the fourth switch circuit is turned off and when the second LFD signal generating circuit outputs the second load free driving signal having the gate low voltage, the fifth switch circuit is turned off and the fourth switch circuit is turned on.

12. A touch driving system comprising:
a touch driving device to drive a plurality of touch electrodes disposed in a panel; and
a touch power management circuit to output a finger touch driving signal to the touch driving device in a finger touch driving period and to output a pen touch driving signal to the touch driving device by using a first power voltage and a second power voltage inputted from an external circuit in a pen touch driving period, wherein the finger touch driving signal is a signal in which a first modulation voltage and a second modulation voltage alternate and the pen touch driving signal is a signal in which the first power voltage and the second power voltage alternate;

a first load free driving (LFD) signal generating circuit to receive a gate low voltage from a power management integrated circuit and to output, during the finger touch driving period, a first load free driving signal in which a gate low voltage and a third modulation voltage higher than the gate low voltage alternate.

13. The touch driving system of claim 12, wherein the first power voltage is an AVDD voltage or a PVDD voltage inputted from a power management integrated circuit and the second power voltage is a GND voltage inputted from a ground GND of the touch power management circuit or an NVDD voltage inputted from the power management integrated circuit.

14. The touch driving system of claim 12, wherein the first power voltage is higher than the first modulation voltage and the second power voltage is lower than the second modulation voltage.

15. The touch driving system of claim 12, wherein the touch power management circuit receives a third power voltage from an external circuit, outputs to the touch driving device a first load free driving signal having a phase and an amplitude identical to those of the finger touch driving signal in the finger touch driving period, and outputs to the touch driving device a second load free driving signal having a phase and an amplitude identical to those of the pen touch driving signal by using the third power voltage in the pen touch driving period.

16. The touch driving system of claim 15, wherein the third power voltage is a GND voltage inputted from a ground GND of the touch power management circuit.

17. A touch power management circuit comprising:

a first load free driving (LFD) signal generating circuit to receive a gate low voltage from a power management integrated circuit and to output a first load free driving signal, in which the gate low voltage and a modulation voltage higher than the gate low voltage alternate, during a finger touch driving period; and a second LFD signal generating circuit to receive a power voltage higher than the modulation voltage from an external circuit and to output a second load free driving signal, in which the gate low voltage and the power voltage alternate, during a pen touch driving period.

18. The touch power management circuit of claim 17, wherein the power voltage is a ground (GND) voltage inputted from a ground of the touch power management circuit.

19. The touch power management circuit of claim 17, wherein the first LFD signal generating circuit comprises:

an amplifier to output the modulation voltage;

a first switch circuit, one end of which is electrically connected with an output side of the amplifier and the other end of which is electrically connected with an output line to output the first load free driving signal or the second load free driving signal; and a second switch circuit, one end of which is electrically connected with a VGL input line to input the gate low voltage and the other end of which is electrically connected with the output line, wherein the first switch circuit is turned on and the second switch circuit is turned off when the first LFD signal generating circuit outputs the first load free driving signal having the modulation voltage and the first switch circuit is turned off and the second switch circuit is turned on when the first LFD signal generating circuit outputs the first load free driving signal having the gate low voltage.

20. The touch power management circuit of claim 19, wherein the second LFD signal generating circuit comprises:

a third switch circuit, one end of which is electrically connected with an input terminal through which the power voltage is inputted and the other end of which is electrically connected with the output line; and the second switch circuit, wherein the third switch circuit is turned off when the first LFD signal generating circuit outputs the first load free driving signal, the first switch circuit is turned off when the second LFD signal generating circuit outputs the second load free driving signal, the third switch circuit is turned on and the second switch circuit is turned off when the second LFD signal generating circuit outputs the second load free driving signal having the power voltage, and the third switch circuit is turned off and the second switch circuit is turned on when the second LFD signal generating circuit outputs the second load free driving signal having the gate low voltage.

* * * * *